United States Patent [19]

Wang

[11] Patent Number: 4,607,703

[45] Date of Patent: Aug. 26, 1986

[54] PEANUTS HARVESTER AND ITS HARVESTING METHOD

[76] Inventor: Kuo-Ming Wang, P.O. Box 10160, Taipei, Taiwan

[21] Appl. No.: 774,007

[22] Filed: Sep. 9, 1985

[51] Int. Cl.⁴ .................. A01D 29/00; A01D 33/02
[52] U.S. Cl. ............................... 171/1; 171/25; 171/27; 171/57; 171/61; 171/62; 171/DIG. 1; 56/119; 56/327 R; 130/30 C
[58] Field of Search ............... 171/1, 11, 25–27, 171/36, 38, 55, 57, 61, 62, 89, 101; 56/119, 314, 327 R; 130/30 R, 30 C

[56] References Cited

U.S. PATENT DOCUMENTS

| | | | |
|---|---|---|---|
| 798,305 | 8/1905 | Smith | 171/27 X |
| 1,791,454 | 2/1931 | Morris | 130/30 C X |
| 2,197,225 | 4/1940 | Pierson | 171/57 X |
| 2,522,644 | 9/1950 | Searcy | 130/30 C |
| 2,902,997 | 9/1959 | Hawkins et al. | 130/30 C |
| 2,940,528 | 6/1960 | Magnuson | 171/1 |
| 2,956,628 | 10/1960 | Rogers et al. | 171/60 |

FOREIGN PATENT DOCUMENTS

| | | | |
|---|---|---|---|
| 125960 | 7/1959 | U.S.S.R. | 171/27 |
| 447982 | 12/1974 | U.S.S.R. | 130/30 R |

Primary Examiner—Robert A. Hafer
Assistant Examiner—Terrence L. B. Brown

[57] ABSTRACT

A peanuts harvester includes a truck body, plant row dividers, stalk straighteners, peanut diggers, a plant feeder, a tilted conveyer, a horizontal conveyer, a peanut stripper and a peanut collector such that the dug peanut plants are conveyed to the horizontal conveyer where the upper stalks are held by the conveyer and the lower peanuts on roots are stripped by the peanut stripper, whereby the stripped peanuts are screened, cleaned and collected into bags for efficient integrated harvesting of peanuts.

5 Claims, 8 Drawing Figures

PEANUTS HARVESTER AND ITS HARVESTING METHOD

BACKGROUND OF THE INVENTION

The conventional method to harvest the peanuts from the peanut plants is performed manually. Many farmers work in the peanut farm to dig the peanuts growing on the root portion of peanut plant under the earth and then remove the soil adhered on the roots and peanuts to collect the product peanuts, which however takes much time, and increases labor and production cost.

The present inventor has found the defects of conventional manual method for harvesting peanuts and invented the present peanuts harvester and its automatic harvesting method.

SUMMARY OF THE INVENTION

The object of the present invention is to provide a peanuts harvester including truck body, at least three plant splitters in front of the truck body, at least two pairs of stalk straighteners, at least two peanut diggers, a plant feeder, a tilted conveyer, a horizontal conveyer, a peanut stripper and a peanut collector, whereby the peanuts under the earth can be automatically dug, lifted, stripped, screened and finally picked up into bags to increase the peanut harvesting efficiency.

Another object of the present invention is to provide a harvesting method through: dividing the rows of of peanut plants, straightening of stalks, digging peanuts under earth and feeding and lifting peanut plants, holding the upper stalks and stripping the lower peanuts on the peanut plants, screening and dust-removing of the stripped peanuts, finally conveying and collecting the peanuts into bags for automatic integrated harvesting operation.

DETAILED DESCRIPTION

Figure 1:
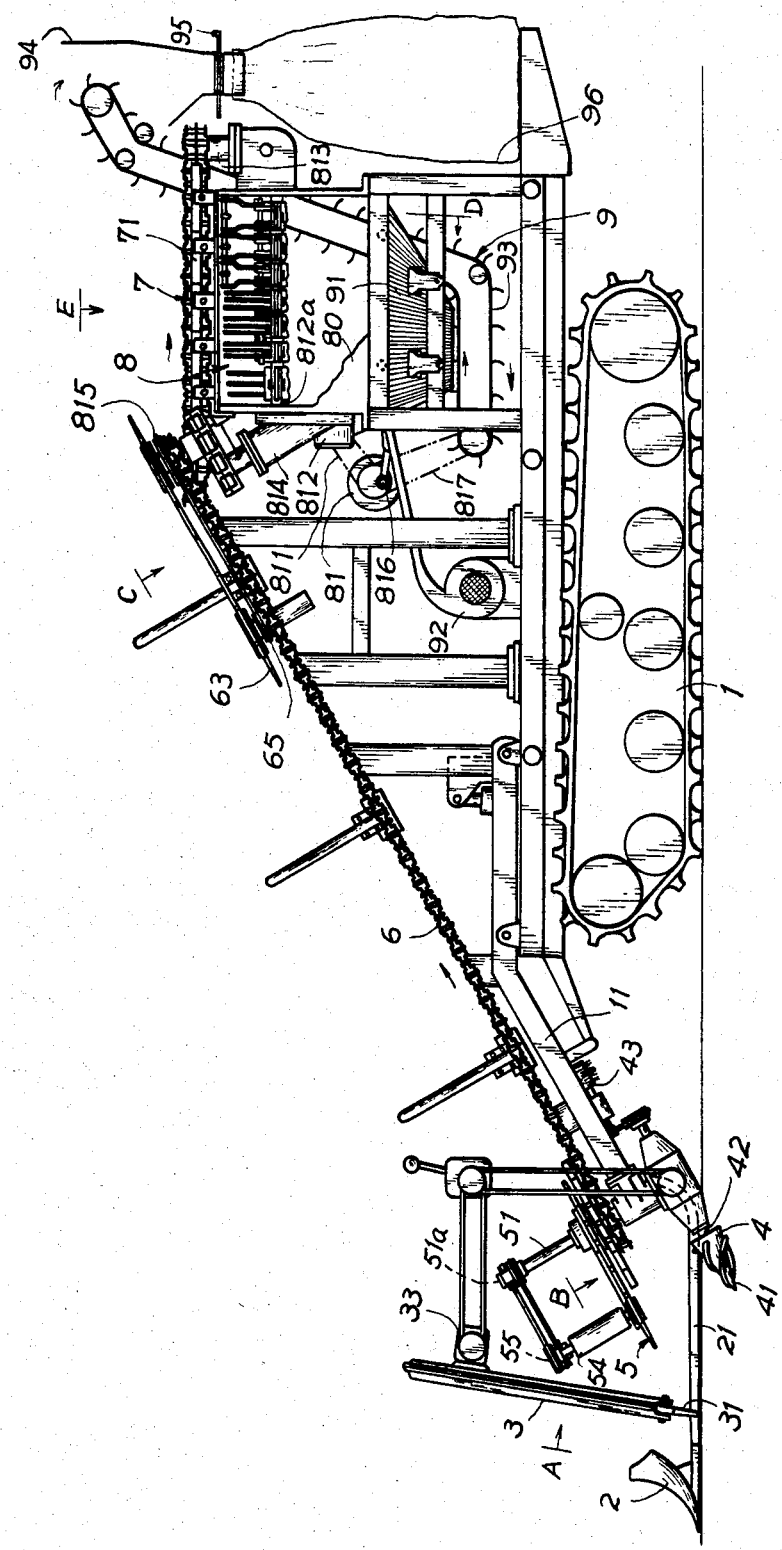
FIG. 1 is an elevation drawing of the assembled present invention.

As shown in the figures, the present invention comprises: a truck body 1, at least three plant row dividers 2, at least two pairs of stalk straighteners 3, at least two peanut diggers 4, a plant feeder 5, a tilted conveyer 6, a horizontal conveyer 7, a peanut stripper 8 and a peanut collector 9.

The plant splitter 2 is formed as a tapered front portion and a rear portion with divergent arcuated shape, and fixed on the front end of the truck frame 11 by links 21.

Figure 2:
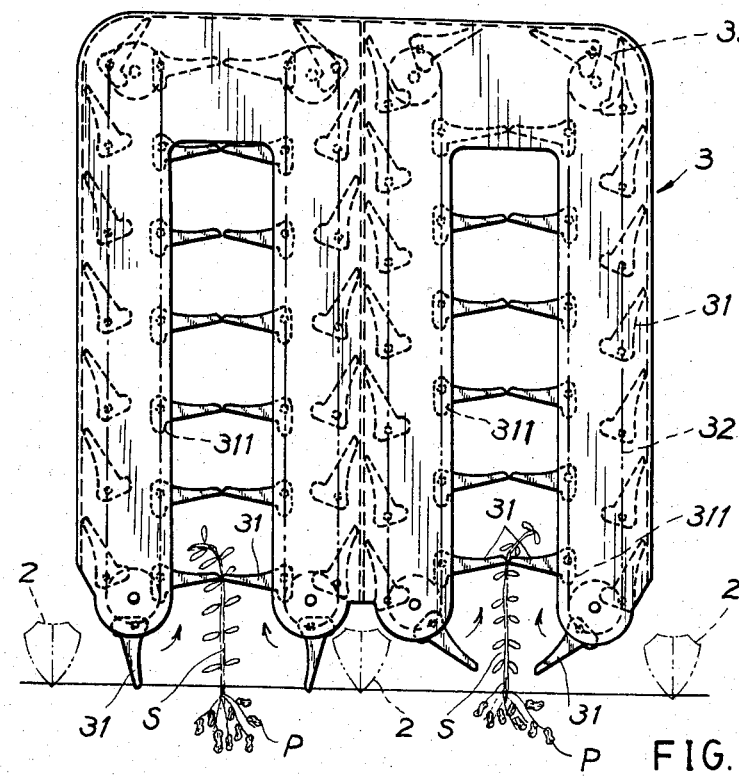
FIG. 2 shows the stalk straightener of the present invention from direction A of FIG. 1.

Each stalk straightener 3 includes a plurality of straightening blades 31, each pivotedly fixed on a loop chain 32 and each having a base extension 311 to allow the blade horizontally to be backed against the chain as shown in FIG. 2 so that two corresponding blades facing each other will straighten the stalk S of a peanut plant, available for feeding into the feeder 5. Each staightener 3 is driven by driving unit 33 coupled to the shaft 42 of the digger 4.

Figure 3:
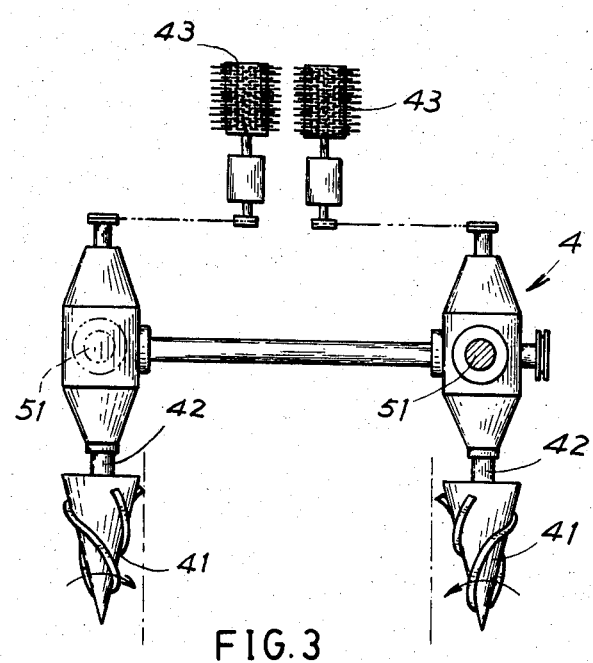
FIG. 3 shows peanut digger and soil remover of the present invention.
Figure 4:
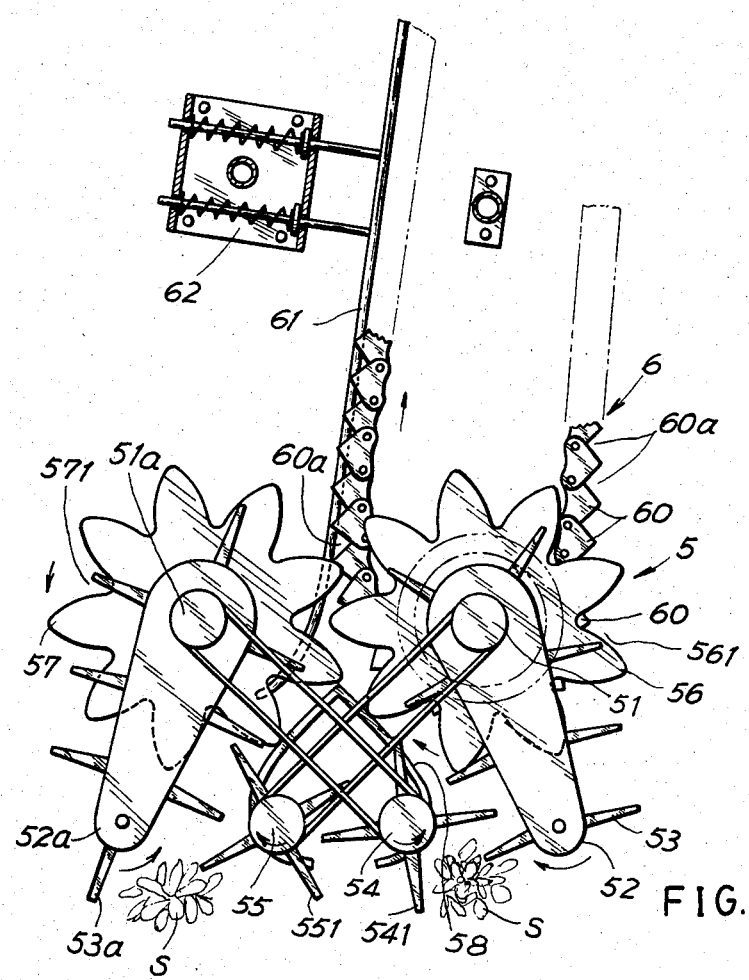
FIG. 4 shows the plant feeder of the present invention from direction B of FIG. 1.
Figure 5:
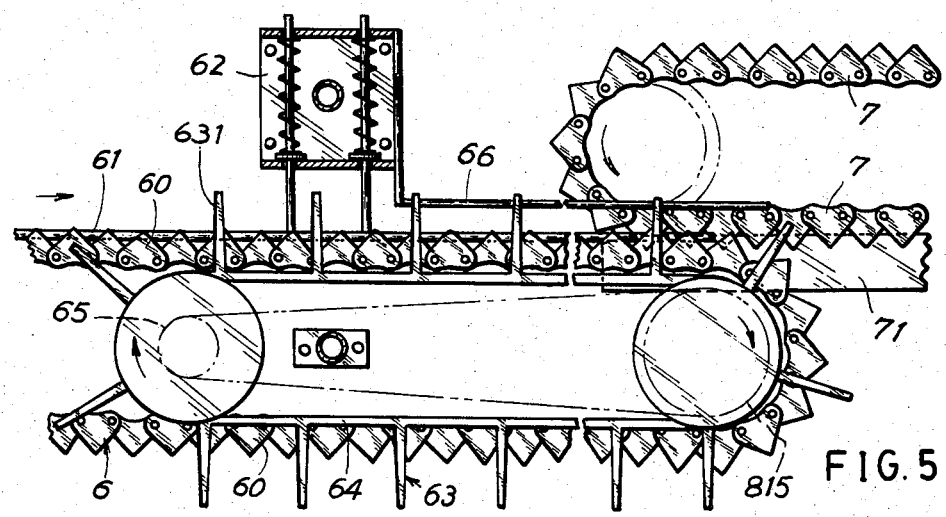
FIG. 5 shows the take-over of horizontal conveyer from tilted conveyer as viewed from direction C of FIG. 1.
Figure 6:
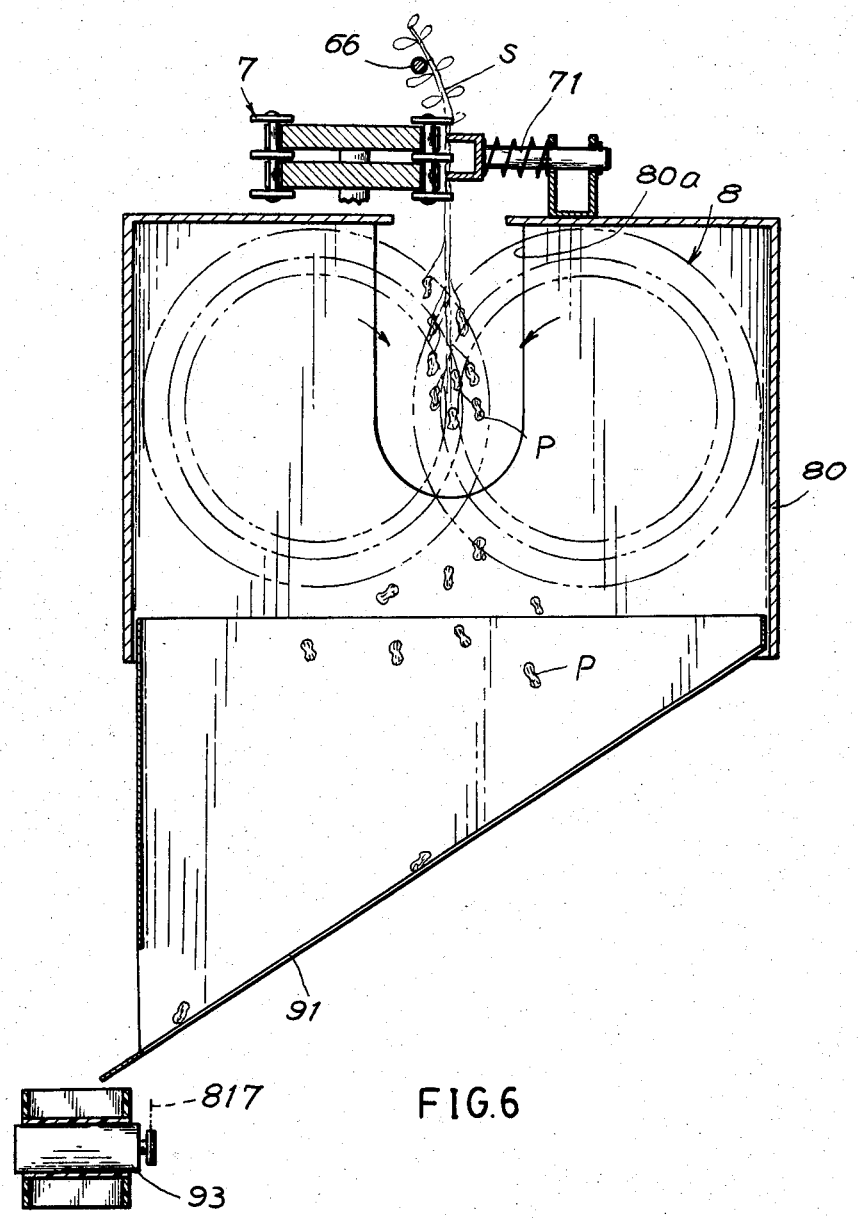
FIG. 6 shows the peanut stripper of the present invention from direction D of FIG. 1.

Each digger 4 includes a digger head 41 operatively digging the peanuts under the earth in a direction adapted for feeding the peanut plants into feeder 5, and a shaft 42 driven by a vertical spindle 51 coupled to the driving gear unit 815 as driven by motor 81. The second digger 4 is coupled to the first digger 4 as shown in FIG. 3. A pair of soil removers 43 provided with soft brushes are coupled to the shaft 42 of digger 4 to primarily remove the soil adhered on the roots of peanut plants.

The plant feeder 5 includes: a vertical first spindle 51 coupled through driving gear unit 815 to the driving motor 81, a right-side conveying loop 52 fixed with plurality of blades 53 and rotatably pushing the peanut stalks S inwards in cooperation with a right-side follower spindle 54 having plurality of blades 541, a second spindle 51a coupled to first spindle 51 and driving the right-side follower spindle 54 by a belt, a left-side conveying loop 52a fixed with a plurality of blades 53a and rotatably pushing the peanut stalks S inwards in cooperation with a left-side follower spindle 55 having plurality of blades 551, a first feeding wheel 56 having plurality of recess portions 561 along its perimeter and driven by spindle 51, a second feeding wheel 57 having plurality of recess portion 571 and rotatably engaged with the first wheel 56 to feed the peanut plants into conveyor 6, and a convergent guide 58 guiding the two-row stalks into the recess portions 561, 571 defined by the two wheels 56, 57.

The tilted conveyer 6 includes: a plurality of connecting links, each having triangle-shaped side plate 60 and every two neighboring plates 60 forming a recess portion 60a, a clamping guide bar 61 resiliently clamping the stalks S between the bar 62 and the recess portions 60a by the back-up springs 62, and a stalk holder 63 formed on the upper portion of conveyor 6. The stalk holder 63 includes a plurality of holding blades 631 fixed on a conveying loop 64 driven by a pulley 65 coupled to the driving gear unit 815 of driving motor 81. The diameter of pulley 65 is one half of that of driving unit 815 to increase the driving speed of blades 631 to double that of the speed of conveyer 6 to quickly push stalks forwards to be picked up by conveyer 7 with the aid of guide bar 66.

The horizontal conveyer 7, pertaining to the upper end of conveyer 6, also includes a plurality of triangle-shaped side plates on the connecting links of a chain and plurality of resilient clamps 71 resiliently clamp the upper stalks to allow the lower peanuts on root to be pendant into stripper 8.

The peanut stripper 8 includes: a casing 80; a driving motor 81; a pair of primary rakes 82 respectively fixed on a pair of shafts 812a driven by transmission unit 811 of motor 81; plural pairs of transversely-stripping rakes 83, each pair of rakes 83 respectively fixed on the two shafts 812a; and plural pairs of longitudinally-stripping rakes 84, each pair of rakes 84 fixed on the shafts 812a. On one end of shaft 812a, a vertical shaft 813 is coupled to shaft 812a for driving the horizontal conveyer 7. On another end of another shaft 812a, there is coupled with a transmission unit 814 coupled to the driving unit 815.

Figure 7:
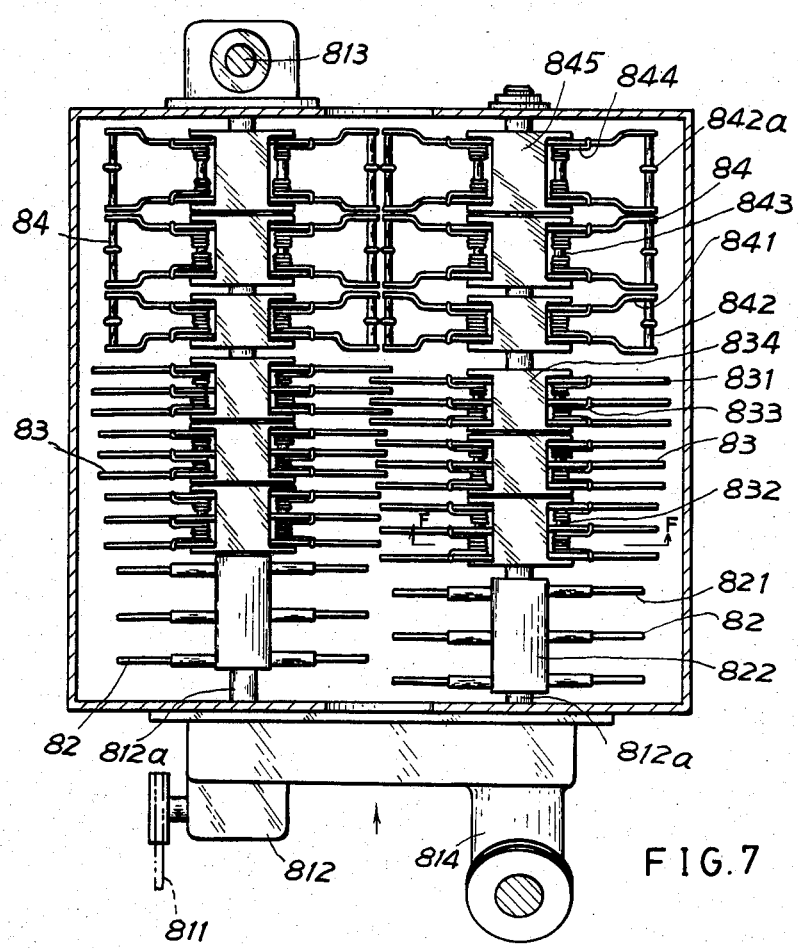
FIG. 7 shows the peanut stripper of the present invention from direction E of FIG. 1.
Figure 8:
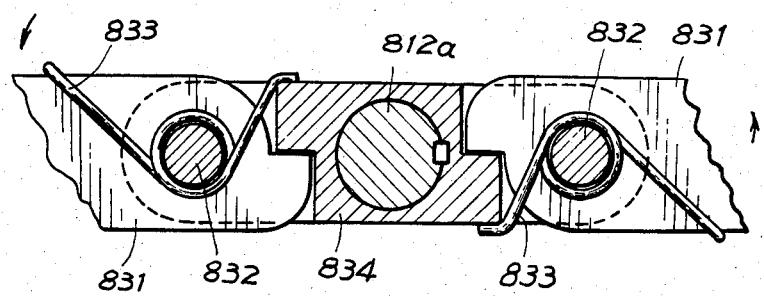
FIG. 8 is a partial illustration of rake of peanut stripper from FF direction of FIG. 7.

Each primary rake 82 includes plurality of combing rods 821 fixed on a hub 822 disposed shaft 812a as shown in FIG. 7.

Each transversely-stripping rake 83 includes plurality of stripping rods 831 each pivotely mounted on a shaft 832 resiliently held on a hub 834 by a spring 833. The stripping rods 831 of one rake 83 transversely comb the corresponding stripping rod 831 of the other opposite rake 83 for stripping the peanuts P off their roots. As shown in FIG. 7, the front pair of rakes 83 can be arranged to have an aperture between two-side rods 831 facing each other and the rear pair of rakes 83 can be arranged to juxtaposedly poke the ends of right-side rods 831 in between the ends of the left-side rods 831, whereby the peanuts will be smoothly stripped stepwise from the front position to the rear position.

Each longitudinally-stripping rake 84 includes a plurality of stripping rods 841, of which every two rods 841 are horizontally connected on the rod ends by a link 842 having tooth 842a on link 842, pivotely mounted on a shaft 843 resiliently held on a hub 845 disposing around shaft 812a by a spring 844. There is an aperture, designed to be slightly smaller than the average size of a peanut, between the two corresponding links 842 facing each other for stripping the peanuts off their roots. The link length at the front rake may be shorter than that at the rear rake for smooth conveying and stripping operation.

The casing 80 provides a front opening and rear opening 80a for input and output of peanut stalks. Under the casing 80, a shaking screen 91 is provided to filter and receive the stripped peanuts. Screen 91 is driven by a crank 816 eccentrically driven by motor 81. A blower 92 is provided to blow air for removing leaf dust accumulated on peanuts when passing screen 91. Under the screen 91, a collecting conveyer 93 driven by transmission unit 817 is provided to lift the peanuts to a collecting hopper 94 opened and closed by a sliding valve 95, to finally collect the peanuts into bag 96. The stripped stalks are then disposed and released from conveyer 7 when moving to pass the shaft 813.

From the above-mentioned structure, the harvesting method is concluded as follows:
1. Dividing the rows of the matured peanut plants adapted for next straightening step;
2. Straightening the stalks for next feeding step;
3. Synchronously holding the stalks and digging the peanuts under the earth and feeding the peanut plants for conveying upwards; and primarily removing the soil on plant roots;
4. Holding the upper stalks and stripping the lower peanuts;
5. Screening and removing the soil or dust on peanuts; and
6. Collecting the peanuts into bags.

I claim:
1. A peanuts harvester comprising:
  a truck body;
  at least three plant row dividers, each formed as a tapered front portion and a rear portion with divergent arcuated shape and fixed on the front end of said truck body;
  at least two pairs of stalk straighteners, each including a plurality of straightening blades pivotely mounted on a loop chain and each having a base extension to allow said blade to be horizontally backed against the chain so that two corresponding blades facing each other may straighten the stalk of peanut plant, said stalk straightener being driven by a driving unit coupled to the shaft of a peanut digger; at least two peanut diggers, each including a digger head operatively digging peanuts under the earth adapted for feeding peanuts into a feeder;
  a soil remover provided with soft brush coupled to the shaft of said digger to primarily remove the soil on the roots of peanut plant;
  a plant feeder including a vertical first spindle coupled to a driving motor, a right-side conveying loop having plurality of blades thereon and rotatably pushing the peanut stalks inwards in cooperation with a right-side follower spindle having plurality of blades thereon, a second spindle coupled to said first spindle and driving the right-side follower spindle, a left-side conveying loop having plurality of blades and rotatably pushing the peanut stalks inwards in cooperation with a left-side follower spindle having plurality of blades thereon, two feeding wheels rotatably engaged with each other and driven by said first spindle, and a convergent guide guiding the two-row stalks into the recess portions defined by said two feeding wheels each formed with plurality of recess portions along its perimeter;
  a tilted conveyer driven by said motor, including plurality of connecting links each having triangle-shaped side plate and every two neighboring side plates forming a recess portion, and clamping bar resiliently clamping the stalks between said bar and said recess portions between said side plates, and a stalk holder having plurality or holding blades on a conveying loop driven by said motor to quickly push the stalks forwards to be picked up by a horizontal conveyer;
  a horizontal conveyer, driven by said driving motor and adjacent to and cooperating with the upper end of said tilted conveyer, including plurality of triangle-shaped side plates on the connecting links of a chain and plurality of resilient clamps clamping the upper stalks to allow the lower peanuts to be pendant downwards;
  a peanut stripper including a casing, a driving motor, a pair of primary rakes, plural pairs of transversely-stripping rakes, and plural pairs of longitudinally-stripping rakes, all rakes resiliently held on the hubs disposed around two shafts driven by said driving motor and capable of combing and stripping the peanuts off the peanut plants when holding the upper stalks on said horizontal conveyer; and
  a peanut collector including a shaking screen positioned under said casing of said peanut stripper, a blower blowing air to remove the dust of peanuts when passing said screen, a collecting conveyer driven by said motor and lifting the peanuts to a collecting hopper to be finally collected in a bag.

2. A peanuts harvester according to claim 1, wherein each of said primary rakes of said peanut stripper includes plurality of combing rods, mounted on a hub disposed around said shaft coupled to said motor.

3. A peanuts harvester according to claim 1, wherein each of said transversely-stripping rakes includes plurality of stripping rods, each pivotely mounted on a shaft resiliently held on a hub disposed around said shaft coupled to said driving motor, the front pair of transversely-stripping rakes arranged to have an aperture between the rods of each side of the front pair of rakes facing each other and the rear pair of rakes having the rod ends on the right-side rake juxtaposedly poking in between the rod ends of the left-side rake, whereby the peanuts will be smoothly stripped stepwise from the front position to the rear position.

4. A peanuts harvester according to claim 1, wherein each of said longitudinally-stripped rakes includes plurality of stripping rods, of which two rods are horizontally connected on the rod ends by a link having tooth thereon, pivotedly mounted on a shaft resiliently held on a hub disposed around said shaft coupled to said driving motor, the link length of a front rake of said longitudinally-stripping rakes being shorter than the link length of a rear rake for smooth conveying and stripping operation.

5. A peanuts harvesting method including the following steps:
- A. Operating the peanut harvester having the limitations as set forth in claim 1;
- B. Dividing the rows of the matured peanut plants adapted for next straightening step;
- C. Straightening the stalks;
- D. Synchronously holding the stalks and digging the peanuts under the earth and feeding the peanut plants for conveying upwards and primarily removing the soil on roots;
- E. Holding the upper stalks and stripping the lower peanuts;
- F. Screening, removing the soil or dust accumulated on peanuts and collecting the peanuts into bags.

* * * * *